(12) United States Patent　　　　(10) Patent No.:　US 12,578,745 B2
Kleine　　　　　　　　　　　　　　(45) Date of Patent:　Mar. 17, 2026

(54) OVERSHOOT DETECTION IN VOLTAGE REGULATORS

(71) Applicant: Renesas Electronics America Inc., Milpitas, CA (US)

(72) Inventor: John Stuart Kleine, Cary, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 204 days.

(21) Appl. No.: 18/592,209

(22) Filed: Feb. 29, 2024

(65) Prior Publication Data

US 2024/0295892 A1　　Sep. 5, 2024

Related U.S. Application Data

(60) Provisional application No. 63/488,342, filed on Mar. 3, 2023.

(51) Int. Cl.
| | |
|---|---|
| *G05F 1/571* | (2006.01) |
| *G05F 1/46* | (2006.01) |
| *G05F 1/613* | (2006.01) |
| *H02H 9/04* | (2006.01) |
| *H02M 1/32* | (2007.01) |
| *H02M 3/155* | (2006.01) |

(52) U.S. Cl.
CPC .............. *G05F 1/571* (2013.01); *G05F 1/462* (2013.01); *G05F 1/613* (2013.01); *H02H 9/04* (2013.01); *H02M 1/322* (2021.05); *H02M 3/155* (2013.01)

(58) Field of Classification Search
CPC ........ H02M 1/32; H02M 1/322; H02M 3/155; H02M 3/156; H02M 3/158; H02M 3/1588; G05F 1/613; G05F 1/462; G05F 1/571; H02H 9/04
See application file for complete search history.

(56) References Cited

U.S. PATENT DOCUMENTS

| | | | | |
|---|---|---|---|---|
| 7,888,918 B2 * | 2/2011 | Wu | ........................ | H02M 3/157 |
| | | | | 323/283 |
| 11,394,301 B1 * | 7/2022 | Lisuwandi | .......... | H02M 3/1582 |
| 2017/0170728 A1 * | 6/2017 | Ihs | ........................ | H02M 3/158 |
| 2022/0069713 A1 * | 3/2022 | Khamesra | ............... | H03F 3/183 |
| 2024/0333127 A1 * | 10/2024 | Maru | ...................... | H02M 1/15 |

* cited by examiner

*Primary Examiner* — Gary L Laxton
(74) *Attorney, Agent, or Firm* — SCULLY, SCOTT, MURPHY & PRESSER, P.C.

(57)　　　　ABSTRACT

A voltage regulator feedback circuit includes a first comparator, a second comparator and a logic circuit. The first comparator is configured to generate an overshoot signal based on a comparison of a voltage regulation target signal to a feedback voltage signal. The second comparator is configured to generate a forward current signal based on a comparison of the current sense amplifier voltage to a reference voltage. The logic circuit is configured to generate a breaking signal based on the overshoot signal and the forward current signal. A gate signal of a transistor connected between a second end of the inductor and a reference ground is generated based at least in part on the breaking signal and is configured to cause the transistor to open based at least in part on the breaking signal having a true value.

20 Claims, 9 Drawing Sheets

OVERSHOOT DETECTION IN VOLTAGE REGULATORS

CROSS-REFERENCE TO RELATED APPLICATION

This application is based upon and claims the benefit of priority under 35 U.S.C. 119 (e) to U.S. Patent Application No. 63/488,342 filed on Mar. 3, 2023, and titled "METHOD OF FAST OVERSHOOT DETECTION IN VOLTAGE REGULATORS WITH DROOP CONTROL," the entire disclosure of which is incorporated herein by reference in its entirety.

BACKGROUND

The present disclosure relates in general to semiconductor devices. More specifically, the present disclosure relates to overshoot detection in voltage regulation circuitry.

Voltage regulation circuitry acts as an intermediary to generate regulated constant output voltages from a power supply for use by one or more loads. Such voltage regulation circuits may utilize linear or other voltage regulator components such as buck, boost, and low-dropout (LDO) regulator components. In some cases, when the power requirements of a load rapidly decrease, excess power already present in the voltage regulation circuitry, e.g., in an inductor, may need to be dissipated, e.g., by shunting to an output capacitor followed by draining the output capacitor to ground.

SUMMARY

In an embodiment, a semiconductor device is disclosed that comprises a voltage regulator circuit. The voltage regulator circuit comprises a power input, a reference ground, an inductor comprising a first end and a second end, the second end being connected to a load, a first transistor disposed between the power input and the first end of the inductor, a second transistor disposed between the reference ground and the first end of the inductor, a capacitor disposed between a second end of the inductor and the reference ground and a feedback circuit that is configured to output a gate signal for the second transistor. The gate signal is configured to control a gate of the second transistor to open and close the second transistor. The feedback circuit comprises a first comparator. The first comparator is configured to generate an overshoot signal based on a comparison of a voltage regulation target signal to a feedback voltage signal. The feedback voltage signal is determined based at least in part on an output voltage measured at the second end of the inductor and a current sense amplifier voltage corresponding to a load current measured at the second end of the inductor. The feedback circuit comprises a second comparator. The second comparator is configured to generate a forward current signal based on a comparison of the current sense amplifier voltage to a reference voltage. The feedback circuit comprises a logic circuit. The logic circuit is configured to generate a breaking signal based on the overshoot signal and the forward current signal. The gate signal being generated based at least in part on the breaking signal. The gate signal being configured to cause the second transistor to open based at least in part on the breaking signal having a true value.

In an embodiment, a method of voltage regulation is disclosed. The method comprises obtaining a current sense amplification voltage signal corresponding to a load-line current, determining, based on a comparison of the current sense amplification voltage signal to a reference value, that the load-line current is flowing in a forward direction from a first end of an inductor to a capacitor, obtaining a voltage regulation target signal, obtaining a feedback signal based on an output voltage of the load-line, determining, based on a comparison of the voltage regulation target signal to the feedback signal, that a voltage overshoot is in progress and opening a transistor disposed between a second end of the inductor and a reference ground based on the determination that the load-line current is flowing in the forward direction and the determination that the voltage overshoot is in progress. The opening of the transistor increases a voltage differential across the inductor to increase a rate of dissipation of energy stored in the transistor to the capacitor.

In an embodiment, a voltage regulator feedback circuit is disclosed. The voltage regulator feedback circuit comprises a first comparator. The first comparator is configured to generate an overshoot signal based on a comparison of a voltage regulation target signal to a feedback voltage signal. The feedback voltage signal is determined based at least in part on an output voltage measured at a first end of an inductor of a voltage regulator and a current sense amplifier voltage corresponding to a load current measured at the first end of the inductor. The voltage regulator feedback circuit comprises a second comparator. The second comparator is configured to generate a forward current signal based on a comparison of the current sense amplifier voltage to a reference voltage. The voltage regulator feedback circuit comprises a logic circuit. The logic circuit is configured to generate a breaking signal based on the overshoot signal and the forward current signal. A gate signal of a transistor connected between a second end of the inductor and a reference ground is generated based at least in part on the breaking signal. The gate signal is configured to cause the transistor to open based at least in part on the breaking signal having a true value.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
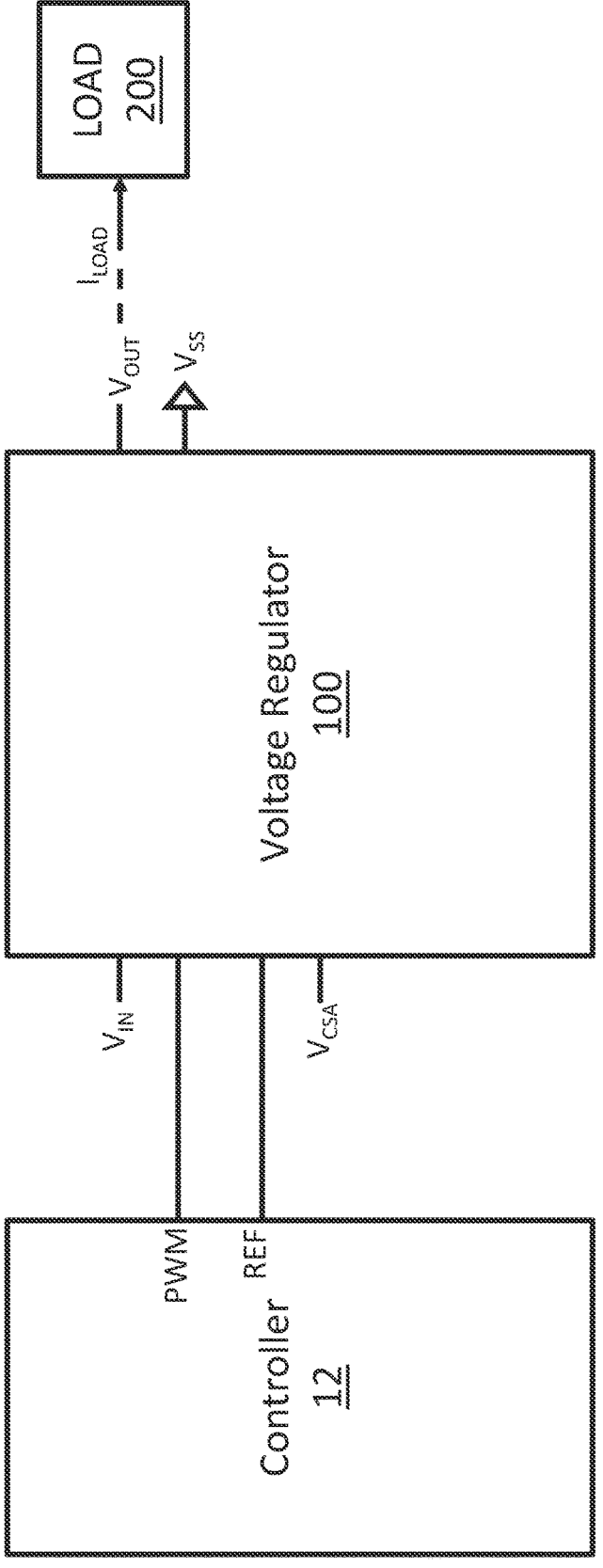
FIG. 1 is a diagram illustrating an example system that implements a voltage regulator according to an embodiment.

FIG. 1 is a diagram showing a system 10 comprising an example voltage regulator 100 according to an embodiment. System 10 comprises a controller 12, voltage regulator 100 and a load 200.

Controller 12 comprises, for example, a processor, microcontroller, central processing unit (CPU), field-programmable gate array (FPGA) or any other circuitry that is configured to monitor and manage the supply of energy to load 200 by voltage regulator 100.

Voltage regulator 100 takes as inputs a voltage input $V_{IN}$, a current sense amplified signal $V_{CSA}$ corresponding to a load current $I_{LOAD}$, a voltage reference signal $V_{REF}$ from controller 12, a pulse-width-modulation signal PWM from controller 12 and a reference ground signal $V_{SS}$. Voltage regulator 100 outputs a regulated voltage output $V_{OUT}$, e.g., for use by a load 200 such as, e.g., a microprocessor. $V_{OUT}$ may also be utilized as an input for feedback purposes. While illustrated as inputs and outputs, any of $V_{IN}$, $V_{CSA}$, $V_{REF}$, PWM, $V_{SS}$ and $V_{OUT}$ may alternatively be connected completely internal to voltage regulator 100 for use by voltage regulator 100 with no external input or output connections. In some embodiments, additional or alternative inputs and outputs may also be utilized.

Figure 2:
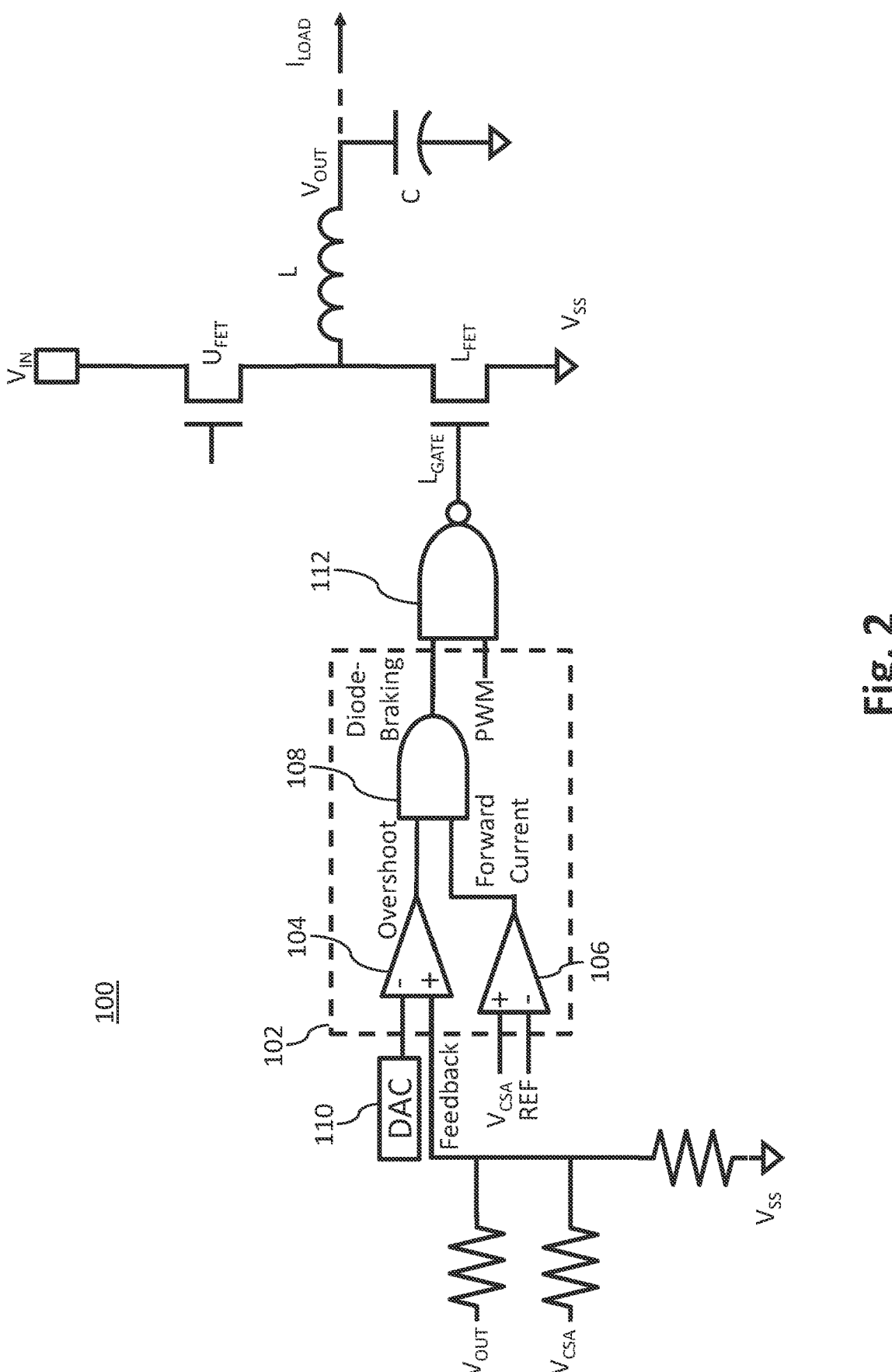
FIG. 2 is a circuit diagram illustrating an example voltage regulator circuit of the system of FIG. 1 according to an embodiment.

With reference to FIG. 2, an example circuit configuration for voltage regulator 100 is illustrated according to an embodiment. $V_{IN}$ is supplied via a high-side field-effect transistor (FET), which is labeled as an upper field-effect transistor $U_{FET}$, to an inductor L which is utilized to generate a regulated output voltage $V_{OUT}$ for use by load 200 (FIG. 1).

Load 200 may comprise, for example, a processor, microcontroller, central processing unit (CPU), field-programmable gate array (FPGA), battery, or any other circuitry that utilizes or otherwise requires a regulated voltage input. A current supplied to load 200, referred to as $I_{LOAD}$, may rapidly increase or decrease as needed depending on the power requirements of load 200.

Figure 3:
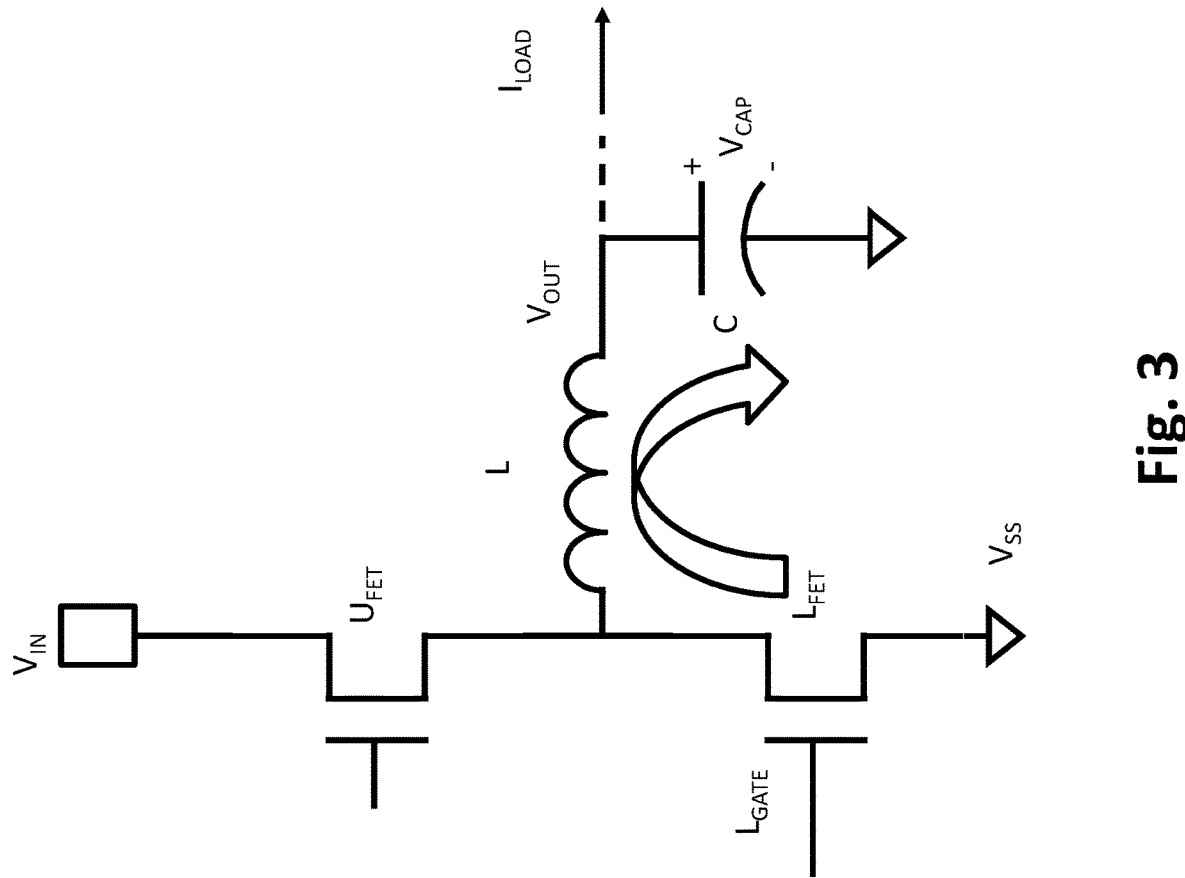
FIG. 3 is a circuit diagram illustrating a flow direction in the voltage regulator circuit of FIG. 2 during an overshoot scenario according to an embodiment.
Figure 4:
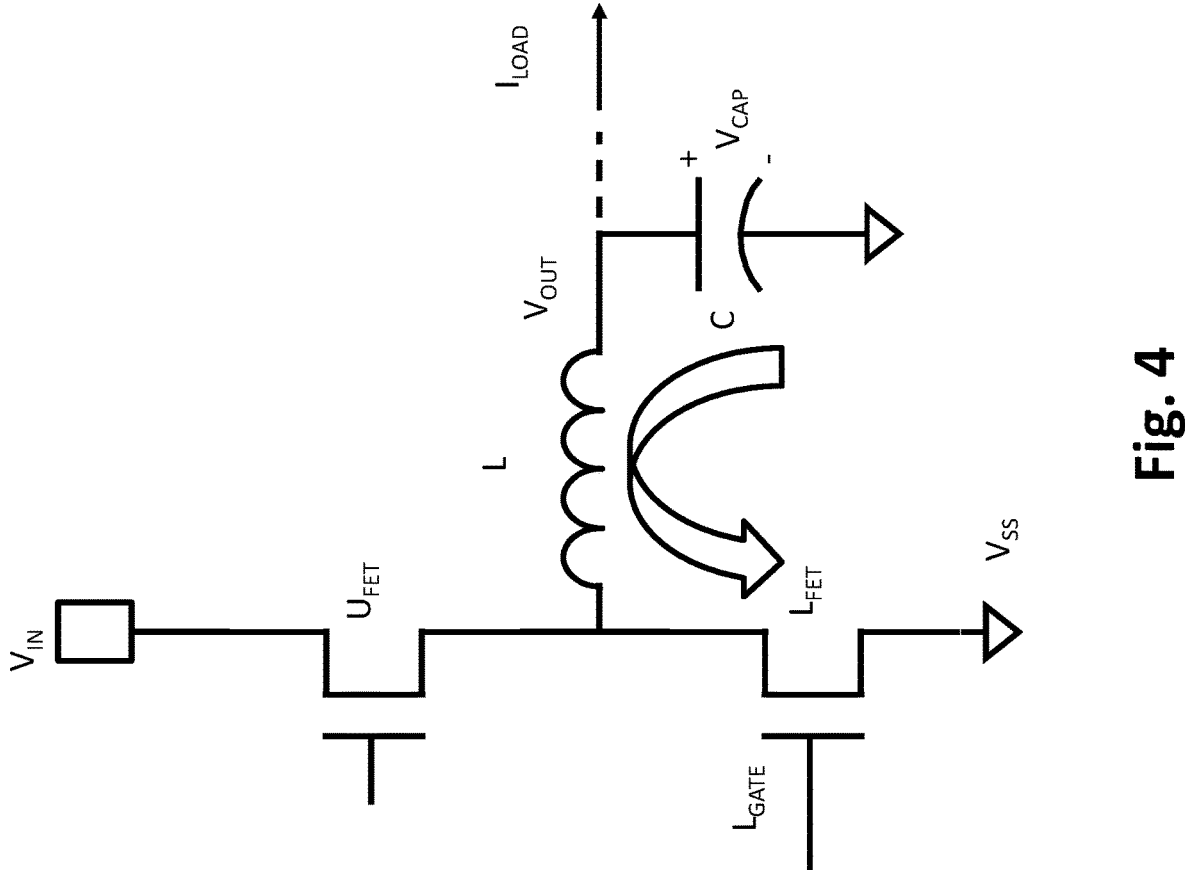
FIG. 4 is a circuit diagram illustrating a flow direction in the voltage regulator circuit of FIG. 2 during after the overshoot scenario has peaked and the current reverses direction according to an embodiment.

When $I_{LOAD}$ rapidly decreases, e.g., the load 200, such as a processor, no longer requires the same amount of power, voltage regulator 100 is configured to temporarily discharge any excess energy found on inductor L to a capacitor C until the current through inductor L is sufficiently reduced, e.g., to a reference value such as 0 A, to the reduced $I_{LOAD}$ value, or to any other predetermined value. Charging up the capacitor C due to a drop off in the power requirements of load 200 is sometimes referred to as an overshoot. An example current flow during an overshoot is shown in FIG. 3 with capacitor C having a charge $V_{CAP}$. The charge $V_{CAP}$ of capacitor C is then drained through a low-side FET, which is labeled as a lower field-effect transistor $L_{FET}$, to the reference ground $V_{SS}$ by reversing the current flow through inductor L as shown in FIG. 4.

Depending on the current load on inductor L and the current $I_{LOAD}$ being drawn by load 200, a rapid reduction in $I_{LOAD}$ may result in a significant voltage overshoot in the charge $V_{CAP}$ on capacitor C to manage discharging the energy stored in inductor L. Designing a circuit to manage such a large potential overshoot may involve the use of a large capacitor C, which takes up a significant footprint in terms of circuitry on a semiconductor device.

Figure 5:
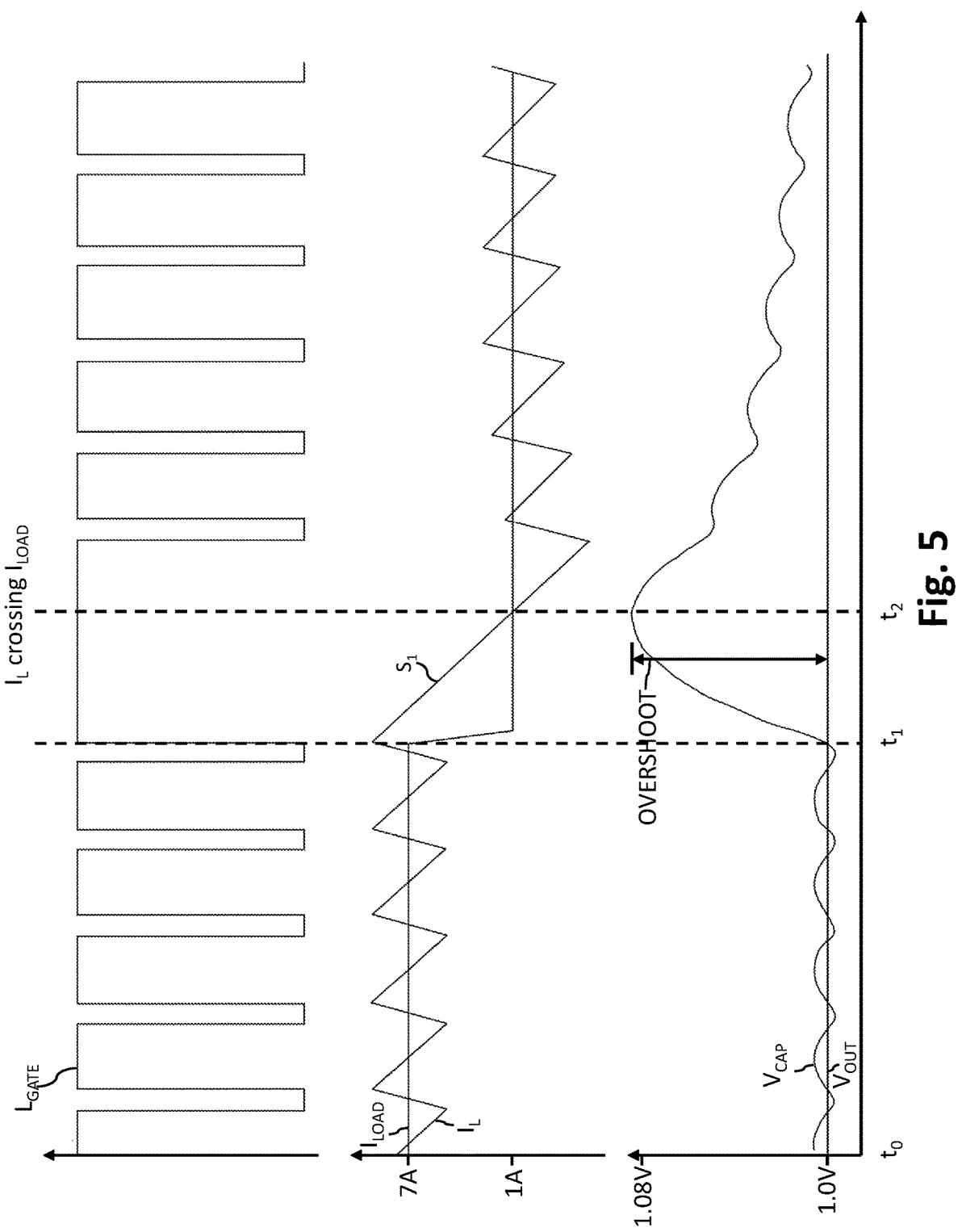
FIG. 5 is a signal diagram illustrating an example of an overshoot scenario when the current drawn by a load is rapidly reduced according to an embodiment.

FIG. 5 illustrates an example signal diagram of an example overshoot scenario. As seen in FIG. 5, a gate signal $L_{GATE}$ for $L_{FET}$ opens and closes $L_{FET}$ to adjust the current $I_L$ through inductor L, e.g., in cooperation with an opening and closing of $H_{FET}$ to supply power from $V_{IN}$ to inductor L. $I_L$ is shown as a waveform based around the current $I_{LOAD}$ being drawn by load 200 while the output voltage is maintained at about $V_{OUT}$. The voltage charge $V_{CAP}$ on capacitor C is charged to about $V_{OUT}$ as well and fluctuates around $V_{OUT}$ based on the load 200 and whether $L_{FET}$ is active and current $I_L$ is flowing through inductor L to $I_{LOAD}$. While specific values such as, e.g., 1.0V, 1.08V, 1 A and 7 A are used for the purposes of description, any other values may alternatively be utilized.

At time $t_0$, in the example scenario, $I_{LOAD}$ is drawing a current of 7 A at a $V_{OUT}$ of 1.0V which inductor L and capacitor C are maintaining based on the operation of $H_{FET}$ and $L_{FET}$.

At a time $t_1$, $I_{LOAD}$ has been significantly reduced, e.g., because load 200 no longer needs power or significantly reduces is power requirements, the $L_{GATE}$ signal is currently high, closing $L_{FET}$, and the charge $V_{CAP}$ on capacitor C increases to discharge the energy stored in inductor L. As part of the discharge, $L_{FET}$, in the closed state, has a low impedance, e.g., an effective $R_{dson}$ of about 0, resulting in a voltage differential across inductor L at time $t_1$ of about $V_{OUT}$, e.g., due to a low impedance of the closed $L_{FET}$ effectively making the voltage on the $L_{FET}$ side of inductor L to be 0V while capacitor C side of inductor L has an initial charge $V_{CAP}$ of about $V_{OUT}$, i.e., the charge already stored on capacitor C. The voltage differential across inductor L may, for example, determine the rate Ldi/dt at which the energy stored in inductor L is discharged to capacitor C, e.g., as seen by the slope $S_1$ of $I_L$ between times $t_1$ and $t_2$.

With continued reference to FIG. 5, when $I_{LOAD}$ drops off rapidly, the current $I_L$ through inductor L begins to drain to capacitor C at voltage $V_{OUT}$ as shown in FIG. 3, increasing the charge $V_{CAP}$ stored on capacitor C. Capacitor C is charged until $I_L$ falls to the new $I_{LOAD}$ value, e.g., 1 A at time $t_2$ in the example diagram although 0 A may be used in other embodiments if the load 200 is removed or turned off, after which capacitor C no longer continues charging. At time $t_2$, for example, the charge $V_{CAP}$ on capacitor C may be about 1.08V, or $V_{OUT}$+0.08V, a 0.08V overshoot. Once $I_L$ falls past $I_{LOAD}$, e.g., reaches a current equilibrium with $I_{LOAD}$, the current flow reverses direction and flows from capacitor C through inductor L, through $L_{FET}$ to the reference ground $V_{SS}$ to discharge the overshoot from capacitor C, as shown in FIG. 4. In one embodiment, $I_{LOAD}$ can continue to reduce until $I_{LOAD}$ becomes less than a relatively low threshold, such as being less than 1 A (but does not reach zero), and the discharge can continue until $L_{FET}$ is turned off. The capacitor C can supply current to both $I_{LOAD}$ and $I_L$ until $U_{FET}$ & $L_{FET}$ returns $V_{CAP}$ to the target voltage of $V_{CAP}$. In this manner, the overshoot caused by the existing charge on inductor L when $I_{LOAD}$ is rapidly reduced is controlled by voltage regulator 100 through discharge of capacitor C back to $V_{OUT}$. In some embodiments, when the charge $V_{CAP}$ on capacitor C is determined to be above $V_{OUT}$ by a predetermined amount, e.g., 10% or another value, $L_{GATE}$ may be controlled to open $L_{FET}$ to reduce the amount of charge being applied to capacitor C from inductor L.

Figure 6:
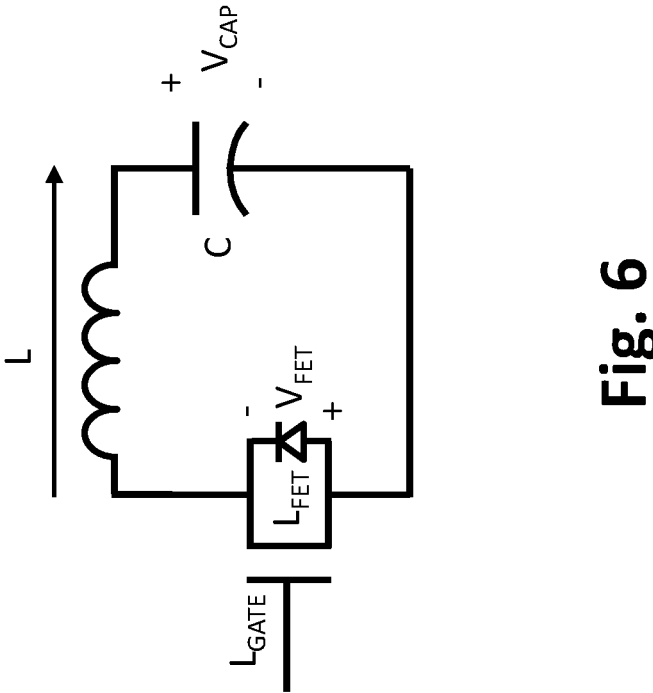
FIG. 6 is a circuit diagram illustrating a voltage differential across an inductor of the voltage regulator circuit of FIG. 2 during diode-breaking according to an embodiment.

In an embodiment, the rate at which the current $I_L$ stored on inductor L charges to capacitor C may be improved to reduce the amount of overshoot. For example, $L_{FET}$ may be opened such that it acts as a diode brake on the current $I_L$ by adjusting the voltage differential across inductor L. With reference to FIG. 6, for example, when $L_{FET}$ is open, $L_{FET}$ acts as a diode having a voltage differential $V_{FET}$ between the reference ground $V_{SS}$ and inductor L. Capacitor C has a voltage differential $V_{OUT}$, the initial charge of $V_{CAP}$, between the other end of inductor L and reference ground $V_{SS}$. As capacitor C charges up above $V_{OUT}$, the voltage across inductor L also changes, and the voltage across L equivalent to $V_{CAP}-V_{FET}$, thus as $V_{CAP}$ increase the voltage across inductor L also increase. The voltage differentials across $L_{FET}$ and capacitor C together define a voltage differential across inductor L of $V_{OUT}-V_{FET}$ which may be utilized to increase the rate at which the current on inductor L charges less into capacitor C, thereby reducing the amount of voltage $V_{CAP}$ charged up on capacitor C by the time $I_L$ crosses $I_{LOAD}$ compared to the example scenario described above in FIG. 5 where $L_{FET}$ is left closed with low imped-ance, e.g., an $R_{dson}$ of about 0, and only opened in some embodiments if the voltage charge $V_{CAP}$ on capacitor C exceeds a predetermined amount such as, e.g., 10% above $V_{OUT}$ or another value. In an embodiment, for example, the diode-breaking effect of the open $L_{FET}$ may be utilized to dissipate some of the energy stored on inductor L, reducing the amount energy discharged to capacitor C and therefore the amount of voltage overshoot on capacitor C.

Figure 7:
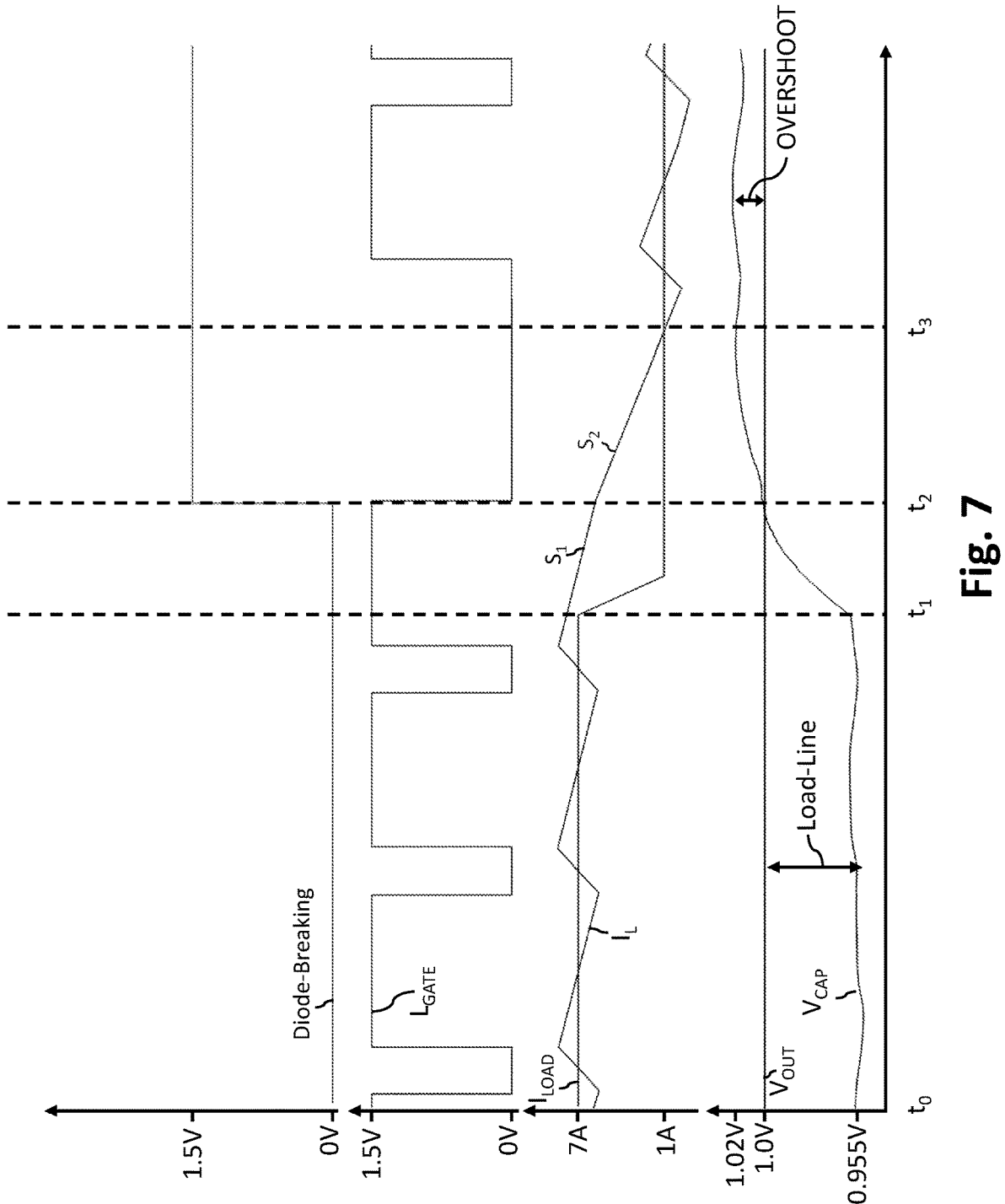
FIG. 7 is a signal diagram illustrating an example of an overshoot scenario utilizing a trigger logic circuit of the voltage regulator circuit of FIG. 2 according to an embodiment.

With reference to FIG. 5 and FIG. 7, for example, the timing of when $L_{FET}$ is opened in response to a rapid change in $I_{LOAD}$ may be determined by a trigger logic circuit 102 which is configured to initiate diode-breaking by $L_{FET}$ earlier in the overshoot as compared to the embodiment of FIG. 5 or the use of a percentage based overshoot trigger. Trigger logic circuit 102 comprises comparators 104 and 106, and a logic circuit 108 configured as an AND gate.

Comparator 104 receives a feedback signal based on $V_{OUT}$ (or $V_{CAP}$) and $V_{CSA}$, e.g., scaled by a voltage divider, and compares the feedback signal to a voltage regulation target signal received from a digital-to-analog converter (DAC) input 110, also referred to herein as the DAC signal. For example, the DAC signal may correspond to the target $V_{OUT}$, e.g., 1V in the example scenario. Comparator 104 is configured to determine whether or not an overshoot is occurring, e.g., DAC signal<feedback signal=overshoot, and outputs a corresponding overshoot signal to logic circuit 108. For example, when the DAC signal is less than the feedback signal, comparator 104 outputs the overshoot signal at a value corresponding to a logical true. When the DAC signal is greater than or equal to the feedback signal, comparator 104 outputs the overshoot signal at a value corresponding to a logical true.

Comparator 106 compares an amplified current sense signal $V_{CSA}$ that corresponds to the current output from inductor L towards load 200 and capacitor C, also referred to herein as the load-line current, with a reference signal REF, e.g., 0 A, to determine whether the load-line current is discharging in a forward direction, e.g., toward capacitor C when $V_{CSA}>REF$, and outputs a forward current signal to logic circuit 108. For example, when $V_{CSA}>REF$, forward current signal may be output by comparator 106 at a value corresponding to a logical true, e.g., the current flowing to capacitor C is positive. When $V_{CSA}$ is <=REF, the forward current signal may be output by comparator 106 at a value corresponding to a logical false, e.g., the current has stopped flowing to capacitor C or has reversed and begun flowing from capacitor C.

Logic circuit 108 outputs a diode-breaking signal based on the overshoot and forward current signals. If both the overshoot and forward current signals correspond to a logical true value, logic circuit 108 outputs a logical true value for the diode-breaking signal. Otherwise, logic circuit 108 outputs a logical false value for the diode breaking signal. It is understood that any of these signals may be in digital binary form or may be output as analog values at voltages or other signal properties that correspond to the appropriate binary output, e.g., a voltage value correspond-ing to true or false.

The diode-breaking signal is fed into a logic circuit 112 along with a PWM signal which controls the opening and closing of $L_{FET}$ during normal operation of the voltage regulator. In some embodiments, logic circuit 112 may comprise a NOR gate functionality although other types of logic circuits may alternatively be utilized. Logic circuit 112 outputs the $L_{GATE}$ signal to control the activation of $L_{FET}$.

As shown in FIG. 7, for example, between time $t_0$ and time $t_2$, the diode-breaking signal is set to low, e.g., 0V or binary 0, with the $L_{GATE}$ signal transitioning between an on state, e.g., 1.5V, and off state, e.g., 0V, to open and close $L_{FET}$ and maintain $I_L$ at about the same value as $I_{LOAD}$, e.g., 7 A in this example. $V_{CAP}$ is also maintained at about the target $V_{OUT}$ value of 1V, e.g., at about 0.955V as shown although similar to FIG. 5, $V_{CAP}$ will oscillate between a small positive and negative differential with $V_{OUT}$ over a longer period of time than that shown in FIG. 7, e.g., in similar manner to the oscillation of $I_L$ relative to $I_{LOAD}$.

At time $t_1$, $I_{LOAD}$ drops off drastically from 7 A to 1 A. $L_{GATE}$ is still high with $L_{FET}$ being turned closed, e.g., having a low impedance and little to no voltage differential.

As seen from time $t_1$ to time $t_2$, $I_L$ begins to decrease at slope $S_1$, e.g., the same or a similar slope to that which $I_L$ normally decreases at when $L_{GATE}$ is high and $L_{FET}$ is closed. For example, slope $S_1$ may correspond to $Ldi/dt=D_{V_L}$ where $D_{V_L}$ is initially $V_{OUT}$. $V_{CAP}$ also rapidly increases as the excess energy from inductor L is discharged to capacitor C instead of flowing to load 200.

At time $t_2$, trigger logic circuit 102 determines that there is forward current and an overshoot in progress, e.g., based on feedback from $V_{OUT}$, $V_{CSA}$, and DAC 110. For example, comparator 106 may determine that the load-line current to capacitor C is flowing forward based on $V_{CSA}$ having a larger value than $V_{REF}$ and may set the forward current signal to high. Similarly, comparator 104 may determine that the feedback signal is larger than the DAC signal which indicates that an overshoot is in progress and may set the overshoot signal to high. In other words, the diode-breaking signal can go high when the feedback of $V_{OUT}$ (labeled as $V_{CAP}$ in FIG. 7), is greater than the DAC signal (labeled as $V_{CAP}$ in FIG. 7) as shown at time $t_2$ in FIG. 7.

Since both the forward current signal and the overshoot signal are high, logic circuit 108 outputs a high value for the diode-breaking signal at time $t_2$, e.g., as shown by the diode-breaking signal transitioning from 0V to 1.5V in FIG. 7. Since $L_{GATE}$ was already set to high, e.g., the PWM signal was low between time $t_1$ and time $t_2$ when the diode-breaking signal was low, giving logic circuit 112 a 0, 0 input which corresponds to logic circuit 112 outputting a high $L_{GATE}$ signal, the transition of the diode-breaking signal to high causes logic circuit 112 to output a low $L_{GATE}$ signal, e.g., due to a 1, 0 input, and open $L_{FET}$. For example, as shown in FIG. 7, when the diode-breaking signal transitions from 0V to 1.5V, the $L_{GATE}$ signal transitions from 1.5V to 0V, turning off and opening $L_{FET}$ such that $L_{FET}$ acts as a diode as described above. In other words, when the diode-breaking signal goes high, the $L_{FET}$ will be forced to turned off or forced open, as shown by the $L_{GATE}$ signal going low at time $t_2$.

From time $t_2$ to time $t_3$, with $L_{FET}$ turned off, $I_L$ begins decreasing faster at a steeper slope $S_2$, e.g., because the voltage differential across inductor L is $V_{OUT}-V_{FET}$ instead of just $V_{OUT}$. For example, slope $S_2$ may correspond to Ldi/dt=$D_{V_L}$ where $D_{V_L}$ is $V_{OUT}-V_{FET}$. $V_{CAP}$ continues to rise until time $t_3$ at which point $V_{CAP}$ has stabilized due to the forward current into capacitor C falling to $I_{LOAD}$. As shown in FIG. 7, in this embodiment, $V_{CAP}$ overshoots $V_{OUT}$ by a much smaller amount as compared to the example scenario of FIG. 5 due to the early activation of diode-breaking at $L_{FET}$. For example, as shown in FIG. 7, $V_{CAP}$ only overshoots $V_{OUT}$ by about 0.02V while in FIG. 5, $V_{CAP}$ overshot $V_{OUT}$ by about 0.08V, a significant reduction in the overshoot.

Figure 8:
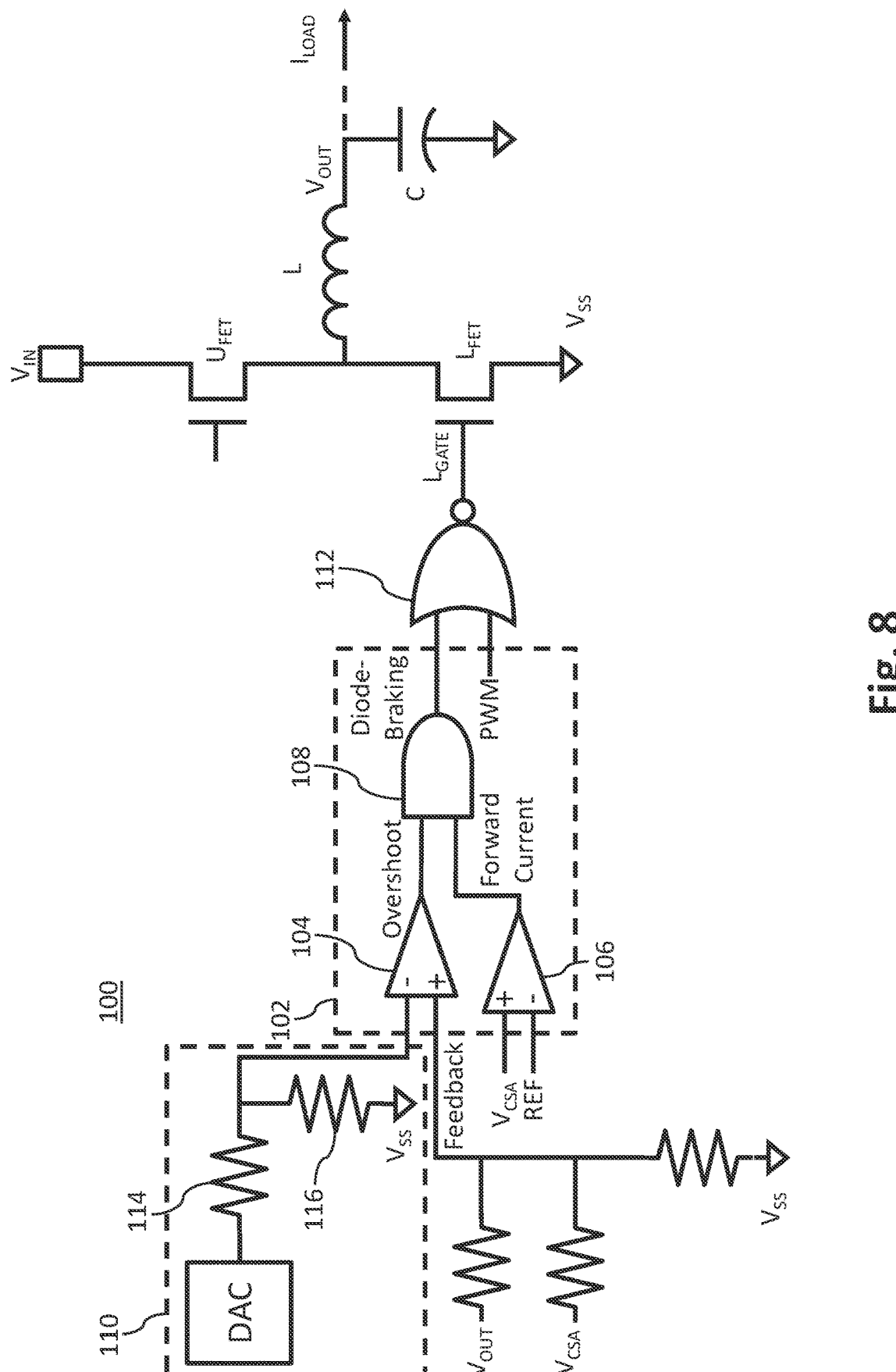
FIG. 8 is a circuit diagram illustrating an example voltage regulator circuit of the system of FIG. 1 utilizing a voltage divider on the DAC input according to an embodiment.

With reference to FIG. 8, in embodiment of voltage regulator 100, DAC input 110 may comprise a resistor divider, e.g., a resistor 114 and a connection to reference ground $V_{SS}$ via a resistor 116. The resistor divider provides a scaled version of the DAC signal for comparison to the scaled feedback signal.

Figure 9:
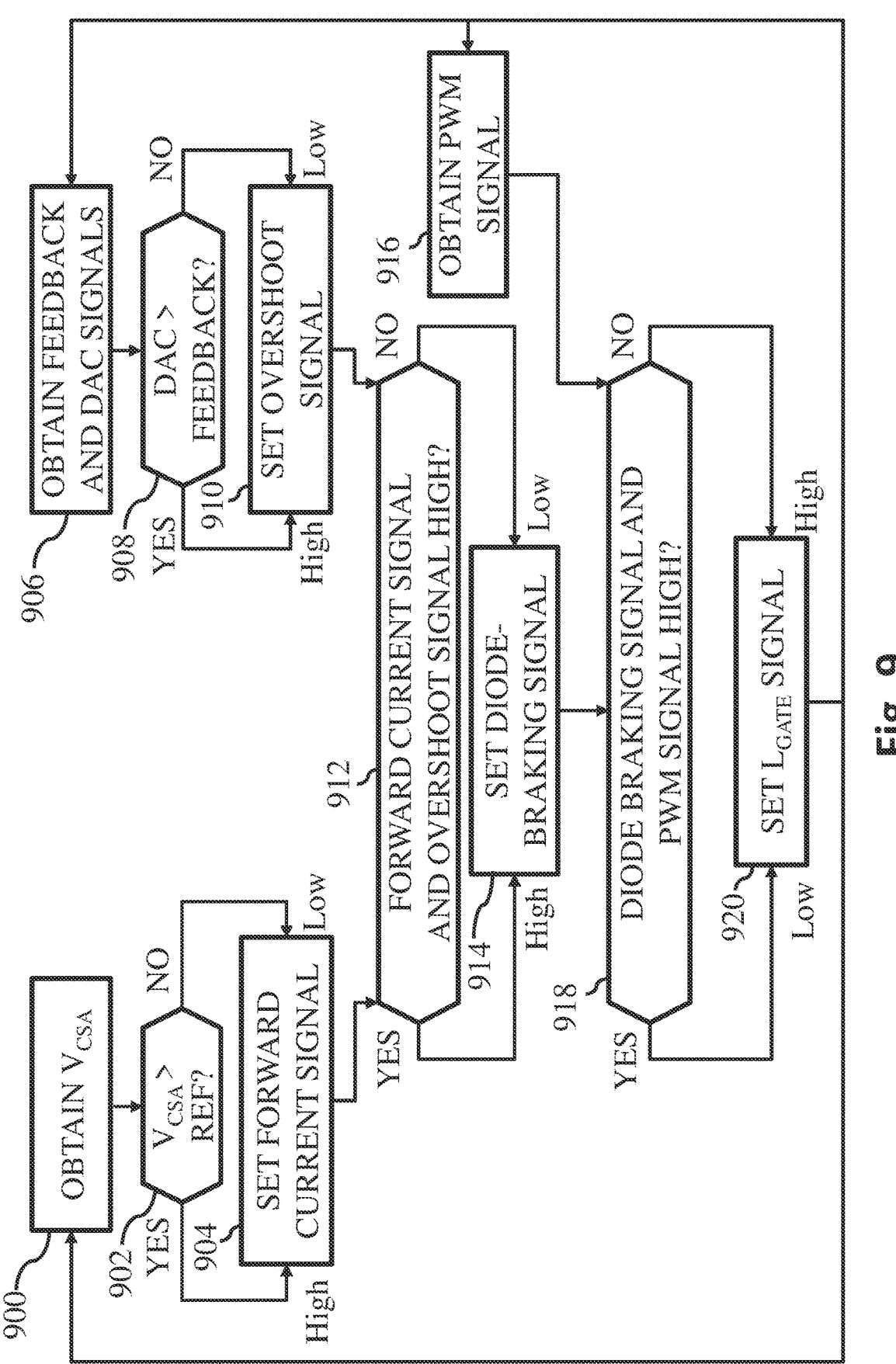
FIG. 9 is a flowchart illustrating an example process implementing voltage regulation during an overshoot scenario using the voltage regulator circuit of FIG. 2 according to an embodiment.

With reference to FIG. 9, a process of using voltage regulator 100 to handle an overshoot scenario will now be described. The process of FIG. 9 comprises steps 900 through 920 and is suitable for use in the system 10 but is more generally applicable to other types of systems for voltage regulation.

At step 900, voltage regulator 100 obtains $V_{CSA}$, e.g., based on a measured current of the load-line.

At step 902, voltage regulator 100 determines whether $V_{CSA}$>REF. If $V_{CSA}$>REF, voltage regulator 100 sets the forward current signal to high at step 904. If $V_{CSA}$=>REF, voltage regulator sets the forward current signal to low at step 904.

At step 906, voltage regulator 100 obtains the feedback and DAC signals.

At step 908, voltage regulator 100 determines whether the DAC signal>the feedback signal. If the DAC signal<the feedback signal, voltage regulator 100 sets the overshoot signal to high at step 910. If the DAC signal≥ the feedback signal, voltage regulator 100 sets the overshoot signal to low at step 904.

Steps 900-904 and 906-908 may be performed in series, in parallel, or in any other order.

At step 912, voltage regulator 100 determines whether both the forward current signal and the overshoot signal are high. If both the forward current signal and the overshoot signal are high, voltage regulator 100 sets the diode-braking signal to high at step 914. If either of the forward current signal and the overshoot signal is not high, voltage regulator 100 sets the diode-breaking signal to low at step 914.

At step 916, voltage regulator 100 obtains a PWM signal from controller 12. Step 916 may be performed in series or in parallel with any of steps 900-914 or in any other order.

At step 918, voltage regulator 100 determines whether at least one of the diode-breaking signal and the PWM signal is high. If at least one of the diode-breaking signal and the PWM signal is high, voltage regulator 100 sets the $L_{GATE}$ signal to low at step 920, opening $L_{FET}$ to initiate diode-breaking of inductor L. If neither of the diode-breaking signal and the PWM signal is high, voltage regulator 100 sets the $L_{GATE}$ signal to high at step 920, closing $L_{FET}$. The process then returns to steps 900, 906 and 916 in any order or in parallel to continue monitoring voltage regulator 100 for an overshoot scenario or the end of an overshoot scenario and setting $L_{GATE}$ accordingly to open or close $L_{FET}$.

The particular processing operations and other system functionality described in conjunction with the flow diagram of FIG. 9 are presented by way of illustrative example only and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement the disclosed embodiments.

Functionality such as that described in conjunction with the process of FIG. 9 may be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The voltage regulator circuitry described in the above embodiments provides a mechanism to trigger an earlier increase in the rate at which the current $I_L$ on inductor L is decreased in a case where the load current $I_{LOAD}$ rapidly decreases. By triggering an earlier increase in the rate at which the current $I_L$ is decreased, the amount of voltage applied to capacitor C by inductor L during an overshoot scenario may be reduced, resulting in a smaller overshoot and the possibility of using a smaller capacitor C for handling overshoot scenarios. Reducing the size of the needed capacitor enables better and more efficient circuit design and reduces the circuit footprint for the capacitor on a semiconductor device implementing the voltage regulator. In addition, by reducing the amount of overshoot, potential damage to the semiconductor device due to a rapid change in the load current may be mitigated or inhibited.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
a voltage regulator circuit comprising:
  a power input;
  a reference ground;
  an inductor comprising a first end and a second end, the second end being connected to a load;
  a first transistor disposed between the power input and the first end of the inductor;
  a second transistor disposed between the reference ground and the first end of the inductor;
  a capacitor disposed between a second end of the inductor and the reference ground; and
  a feedback circuit that is configured to output a gate signal for the second transistor, the gate signal being configured to control a gate of the second transistor to open and close the second transistor, the feedback circuit comprising:
    a first comparator, the first comparator being configured to generate an overshoot signal based on a comparison of a voltage regulation target signal to a feedback voltage signal, the feedback voltage signal being determined based at least in part on an output voltage measured at the second end of the inductor and a current sense amplifier voltage corresponding to a load current measured at the second end of the inductor;
    a second comparator, the second comparator being configured to generate a forward current signal based on a comparison of the current sense amplifier voltage to a reference voltage; and
    a logic circuit, the logic circuit being configured to generate a breaking signal based on the overshoot signal and the forward current signal, the gate signal being generated based at least in part on the breaking signal, the gate signal being configured to cause the second transistor to open based at least in part on the breaking signal having a true value.

2. The semiconductor device of claim 1, wherein the gate signal is generated based at least in part on the breaking signal and a pulse-width modulation signal.

3. The semiconductor device of claim 1, wherein the second transistor is configured to function as a diode when open, a voltage differential across the inductor being equal to a combination of a voltage differential across the diode and a voltage differential across the capacitor.

4. The semiconductor device of claim 1, wherein the logic circuit is configured to generate the breaking signal with a true value based on the overshoot signal and the forward current signal both having true values.

5. The semiconductor device of claim 1, wherein the first comparator is configured to generate the overshoot signal with a true value based on the voltage regulation target signal being less than the feedback voltage signal.

6. The semiconductor device of claim 1, wherein the second comparator is configured to generate the forward current signal with a true value based on the current sense amplifier voltage being greater than the reference voltage.

7. The semiconductor device of claim 1, wherein the inductor is configured to discharge energy to the capacitor at a first rate when the second transistor is closed and a second rate when the second transistor is open, the second rate being faster than the first rate.

8. A method of voltage regulation comprising:
obtaining a current sense amplification voltage signal corresponding to a load-line current;
determining, based on a comparison of the current sense amplification voltage signal to a reference value, that the load-line current is flowing in a forward direction from a first end of an inductor to a capacitor;
obtaining a voltage regulation target signal;
obtaining a feedback signal based on an output voltage of the load-line;
determining, based on a comparison of the voltage regulation target signal to the feedback signal, that a voltage overshoot is in progress; and
opening a transistor disposed between a second end of the inductor and a reference ground based on the determination that the load-line current is flowing in the forward direction and the determination that the voltage overshoot is in progress, the opening of the transistor increasing a voltage differential across the inductor to increase a rate of dissipation of energy stored in the transistor to the capacitor.

9. The method of claim 8, further comprising:
re-obtaining the current sense amplification voltage signal;
determining, based on a comparison of the re-obtained current sense amplification voltage signal to the reference value, that the load-line current has stopped or is flowing in a reverse direction from the capacitor to the first end of the inductor; and
closing the transistor disposed between the second end of the inductor and the reference ground based on the determination that the load-line current has stopped or is flowing in the reverse direction from the capacitor to the first end of the inductor.

10. The method of claim 8, further comprising:
re-obtaining the feedback signal;
determining, based on a comparison of the voltage regulation target signal to the re-obtained feedback signal, that a voltage overshoot is no longer in progress; and
closing the transistor disposed between the second end of the inductor and the reference ground based on the determination that the voltage overshoot is no longer in progress.

11. The method of claim 8, wherein determining, based on the comparison of the current sense amplification voltage signal to the reference value, that the load-line current is flowing in a forward direction from a first end of an inductor to a capacitor comprises determining that the current sense amplification voltage signal is greater than the reference value.

12. The method of claim 8, wherein determining, based on the comparison of the voltage regulation target signal to the feedback signal, that the voltage overshoot is in progress comprises determining that the voltage regulation target signal is less than the feedback signal.

13. The method of claim 8, wherein opening the transistor disposed between the second end of the inductor and the reference ground based on the determination that the load-line current is flowing in the forward direction and the determination that the voltage overshoot is in progress comprises determining that the current sense amplification voltage signal is greater than the reference value and that the voltage regulation target signal is less than the feedback signal.

14. A voltage regulator feedback circuit comprising:

a first comparator, the first comparator being configured to generate an overshoot signal based on a comparison of a voltage regulation target signal to a feedback voltage signal, the feedback voltage signal being determined based at least in part on an output voltage measured at a first end of an inductor of a voltage regulator and a current sense amplifier voltage corresponding to a load current measured at the first end of the inductor;

a second comparator, the second comparator being configured to generate a forward current signal based on a comparison of the current sense amplifier voltage to a reference voltage; and a logic circuit, the logic circuit being configured to generate a breaking signal based on the overshoot signal and the forward current signal, a gate signal of a transistor connected between a second end of the inductor and a reference ground being generated based at least in part on the breaking signal, the gate signal being configured to cause the transistor to open based at least in part on the breaking signal having a true value.

15. The voltage regulator feedback circuit of claim 14, wherein the gate signal is generated based at least in part on the breaking signal and a pulse-width modulation signal obtained from a controller.

16. The voltage regulator feedback circuit of claim 14, wherein the transistor is configured to function as a diode when open, a voltage differential across the inductor being equal to a combination of a voltage differential across the diode and a voltage differential across a capacitor connected to the first end of the inductor.

17. The voltage regulator feedback circuit of claim 14, wherein the logic circuit is configured to generate the breaking signal with a true value based on the overshoot signal and the forward current signal both having true values.

18. The voltage regulator feedback circuit of claim 14, wherein the first comparator is configured to generate the overshoot signal with a true value based on the voltage regulation target signal being less than the feedback voltage signal.

19. The voltage regulator feedback circuit of claim 14, wherein the second comparator is configured to generate the forward current signal with a true value based on the current sense amplifier voltage being greater than the reference voltage.

20. The voltage regulator feedback circuit of claim 14, wherein the inductor is configured to discharge energy to a capacitor connected to the first end of the inductor at a first rate when the second transistor is closed and a second rate when the second transistor is open, the second rate being faster than the first rate.

* * * * *